Oct. 14, 1952   N. D. DIAMANTIDES   2,614,241
VOLTAGE REGULATING APPARATUS
Filed Sept. 7, 1950   2 SHEETS—SHEET 1

INVENTOR.
NICHOLAS D. DIAMANTIDES
BY Hudson, Boughton,
Williams, David & Hoffmann.
ATTORNEYS Oct. 14, 1952  N. D. DIAMANTIDES  2,614,241
VOLTAGE REGULATING APPARATUS
Filed Sept. 7, 1950  2 SHEETS—SHEET 2
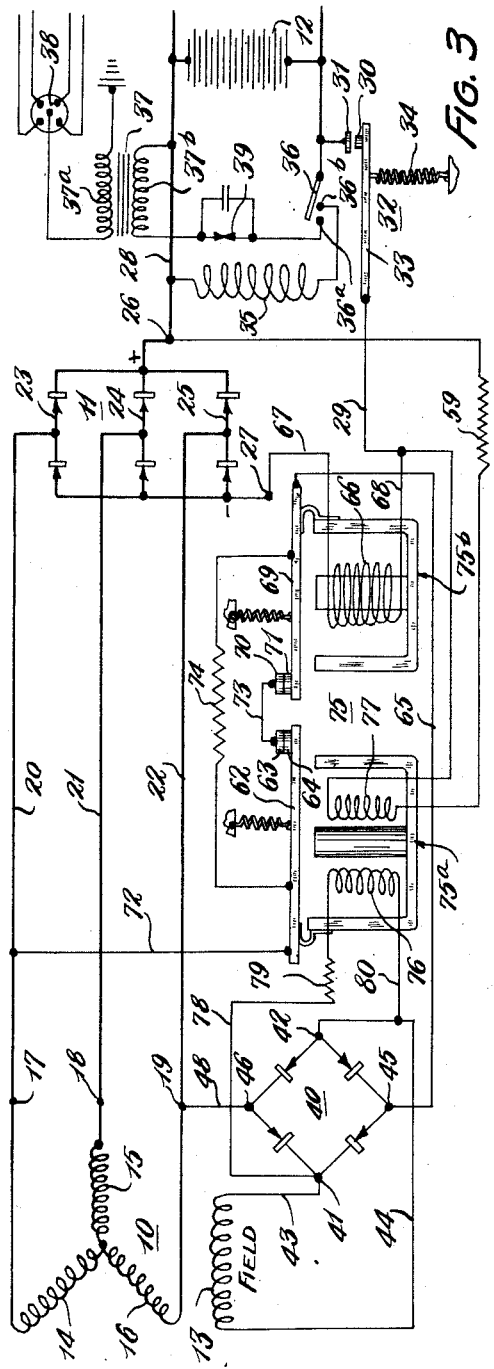
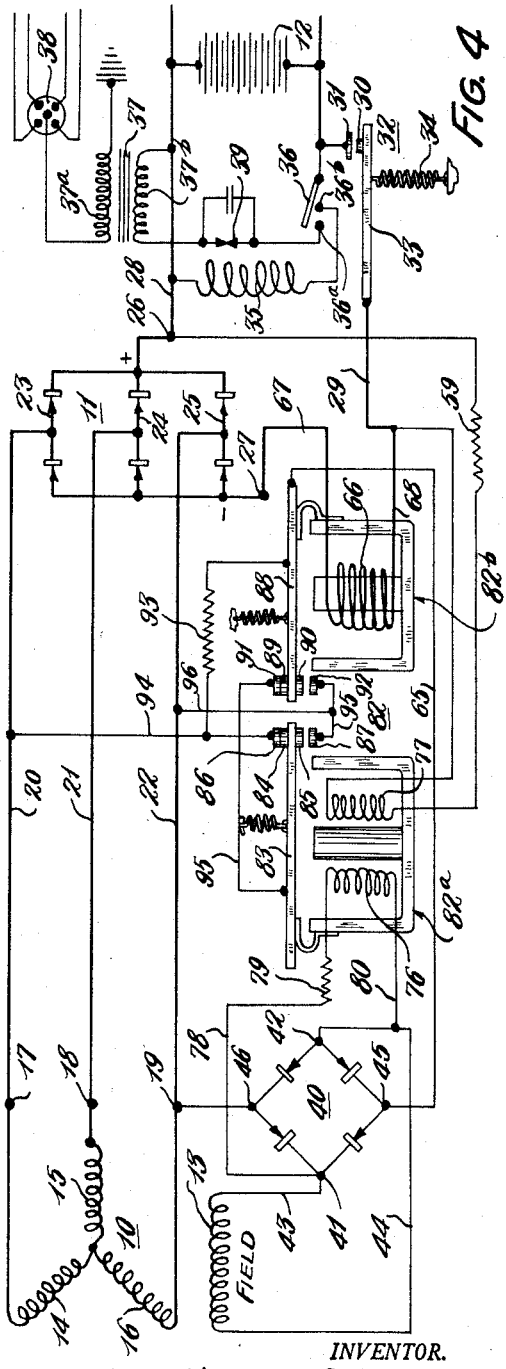
INVENTOR.
NICHOLAS D. DIAMANTIDES
BY Hudson, Boughton,
Williams, David & Hoffmann.
ATTORNEYS Patented Oct. 14, 1952

2,614,241

UNITED STATES PATENT OFFICE 2,614,241

VOLTAGE REGULATING APPARATUS

Nicholas D. Diamantides, Cleveland, Ohio, assignor to The Leece-Neville Company, Cleveland, Ohio, a corporation of Ohio Application September 7, 1950, Serial No. 183,570

14 Claims. (Cl. 321—21)

1

This invention relates to electrical systems of the kind in which an alternator delivers current to a direct current load through a rectifier and, more particularly, to improved regulating means by which the terminal voltage of the alternator can be automatically maintained at a desired value. The invention can be used with various alternator-rectifier systems but is especially practical for vehicle electrical systems in which the alternator is driven at variable speeds according to different operating conditions of the vehicle and, for that reason, the invention is hereinafter described as a vehicle electrical system but without any intention of limiting the invention in this respect.

An object of the present invention is to provide an alternator-rectifier type of electrical generating system in which the field excitation of the alternator is automatically controlled by electromagnetic regulator means having magnet coil means energized by rectified current and also having vibratory switch contact means in the field excitation circuit and located so as to be traversed by alternating current for increased contact life.

Another object of this invention is to provide an improved alternator-rectifier system of this character in which a second rectifier connected with the alternating current terminals of the alternator supplies rectified current to the field winding thereof, and in which the vibratory switch contact means of the electromagnetic regulator means are located in the field energizing circuit at a point between the second rectifier and the alternating current terminals of the alternator.

A further object of this invention is to provide an improved alternator-rectifier system of the character referred to in which the electromagnetic regulator means has two pairs of vibratory switch contacts in the alternating current portion of the field circuit, one pair being responsive to magnet coil means energized by rectified current and including a voltage coil connected across the direct current terminals of the main rectifier, and the other pair being responsive to a current coil connected in series relation to the direct current terminals of the main rectifier.

Still another object is to provide an improved alternator-rectifier system of the kind mentioned in which a resistor means located in the field energizing circuit is connected in shunt relation to both pairs of vibratory regulator contacts.

It is also an object of this invention to provide an alternator-rectifier system in which reg-

2 ulating means is employed comprising a voltage regulator of the relay type and a current regulator of the relay type, and in which these regulators have a plurality of pairs of switch contacts and circuit connections for producing a wide and effective range of regulation and which contacts are traversed by alternating current for increased contact life.

Other objects and advantages of this invention will be apparent from the accompanying drawings and the following detailed description.

In the drawings,

Fig. 3 is a wiring diagram showing another alternator-rectifier system which is similar to Fig. 2 but in which the regulator unit is provided with a plurality of magnet coils; and Fig. 4 shows still another alternator-rectifier system which is similar to Fig. 3 but in which the voltage and current regulator units are of the double contact type.

Figure 1:
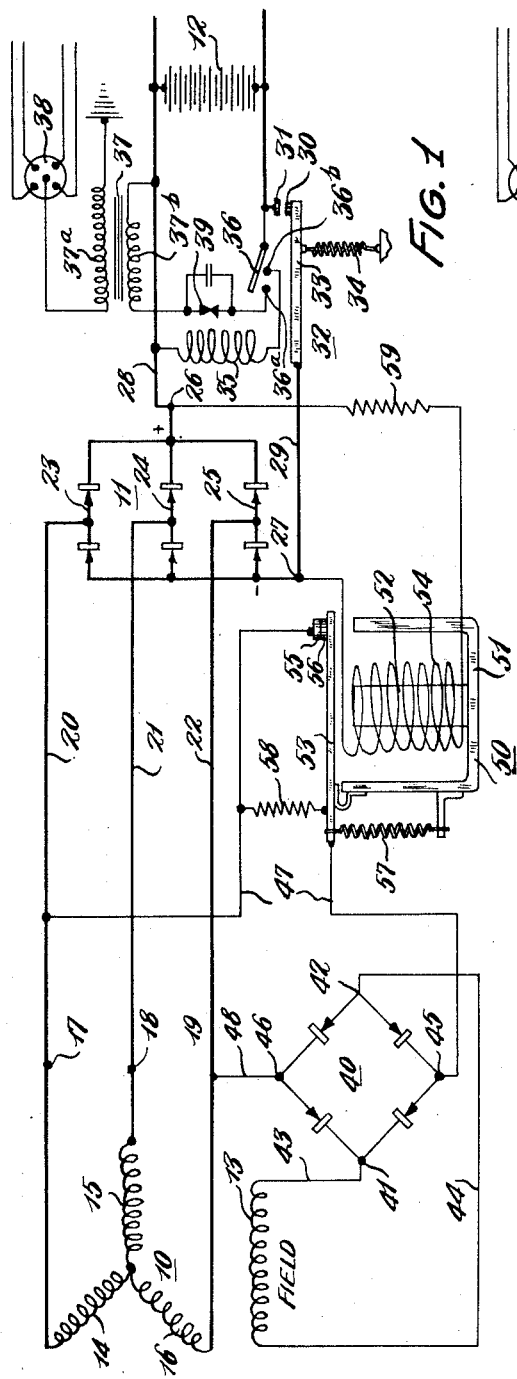
Fig. 1 is a wiring diagram showing an alternator-rectifier type of electrical generating system having the automatic control means of the present invention embodied therein.

Proceeding now with a more detailed description of the improved system, reference will first be made to the form of the invention illustrated in Fig. 1 in which an alternator 10 delivers current through a main rectifier 11 to an external direct current load which is here represented by the storage battery 12. The alternator 10 is shown in this instance as being a polyphase alternator having a field winding 13 and Y-connected inductor windings 14, 15 and 16. The alternator 10 is also shown as having alternating current terminals 17, 18 and 19 with which the rectifier 11 is connected by means of the conductors 20, 21 and 22. The alternator 10 could, of course, be a single phase machine if desired or, instead of being a three-phase alternator with Y-connected inductor windings, it could have delta-connected inductor windings.

The main rectifier 11 may be of the dry plate type and is here shown as being a three-phase full-wave bridge type of rectifier having three circuit arms 23, 24 and 25 with which the terminals 17, 18 and 19 of the alternator 10 are connected respectively by the conductors 20, 21 and 22. The main rectifier 11 also has direct current terminals 26 and 27 with which the conductors 28 and 29 of the external direct current load circuit are connected. The load conductor 28 is connected with one terminal of the battery 12 and the load conductor 29 is connected with the other terminal of the battery through the cooperating switch contacts 30 and 31 of a load relay 32.

The relay 32 is a switch device by which the external load can be disconnected from the direct current load terminals 26 and 27 of the main rectifier 11 to prevent a reverse flow of current from the battery 12 through the rectifier. The contact 30 is a movable contact carried by an armature 33 which is responsive to the action of a tension spring 34 and the energization of the magnet coil 35. When this improved electrical system is embodied in a vehicle it is desirable to have the relay contacts 30 and 31 close automatically when the vehicle is put into operation. This can be acomplished by having the energization of the relay coil 35 controlled by a switch 36 which also serves as the ignition switch of the vehicle.

As diagrammatically shown in Fig. 1, the ignition system of the vehicle includes a conventional spark coil 37 and a conventional distributor 38 with which the secondary winding 37a of the spark coil is connected. The primary winding 37b of the spark coil is connected with the contact 36a of the ignition switch 36 through a circuit breaker 39 so that upon closing of the ignition switch the spark coil will be energized from the battery 12. The switch 36 includes a contact 36b with which the relay coil 35 is connected and which contact is so located that upon closing of the switch 36 the relay 32 will be energized simultaneously with the energization of the spark coil 37.

The field winding 13 of the alternator 10 is energized by a field circuit which includes an auxiliary rectifier 40. This auxiliary rectifier 40 may also be a dry plate full-wave bridge type rectifier having a pair of direct current terminals 41 and 42 with which opposite ends of the field winding 13 are connected by the conductors 43 and 44, and also having a pair of terminals 45 and 46 to which alternating current is adapted to be supplied from the terminals 17 and 19 of the alternator 10 through the conductors 47 and 48.

For automatically controlling the excitation of the field winding 13, an electromagnetic regulator 50 of the relay type is provided which operates to vary the ampere turns of the field winding in response to changes occurring in the operating condition of the alternator 10. The regulator 50 comprises a magnetizable frame 51 which includes a core 52 and an armature 53. The regulator 50 also includes a magnetizing coil 54 located on the core 52 and a pair of cooperating stationary and movable switch contacts 55 and 56. A tension spring 57 connected with the armature 53 acts thereon to normally urge the movable switch contact 56 toward engagement with the stationary contact 55. The regulator 50 also includes a resistor 58 which is connected in the field energizing circuit in shunt relation to the switch contacts 55 and 56.

In connection with the regulator 50, it is important to note that the magnet coil 54 thereof is connected to the direct current terminals 26 and 27 of the main rectifier 11 so that this coil extends across the external direct current load circuit conductors 28 and 29 as a voltage coil and will be directly responsive to voltage changes occurring at the load terminals as the result of changes in the operating characteristics of the alternator 10. A ballast resistor 59 is provided in the energizing circuit of the magnet coil 54 for decreasing the heat dissipation in this coil. It is also important to note that the switch contacts 55 and 56 of the regulator 50 are located in the alternating current portion of the field circuit of the alternator 10.

It will accordingly be seen from the circuit arrangement just described that the magnet coil 54 of the regulator 50 will be energized by rectified current and will, therefore, be very effective in producing a desired rapid rate of vibratory movement for the armature 53. It will also be seen that the portion of the field energizing current controlled by the regulator 50 will be alternating current being supplied to the auxiliary rectifier 40 from the alternating current terminals of the alternator.

The fact that the vibratory switch contacts 55 and 56 of the regulator are traversed by alternating current is an extremely important improvement feature because these contacts have heretofore been subject to rapid deterioration in vibratory electromagnetic regulators but when the current traversing these contacts is an alternating current, as herein provided, the contacts are no longer subject to such rapid deterioration but will remain in good condition for efficient operation for a long period of service. This improved functioning of the vibratory contacts 55 and 56 on alternating current is probably due to the fact that because of the frequent reversal in the direction of current flow, the polarity of the arc which occurs in the contact gap changes with each reversal of the current and this minimizes the transfer of metal from one contact to the other, which has heretofore resulted in pitting or burning of one contact and the formation of an irregular projection on the other contact.

In connection with the functioning of the regulator 50 it will be understood, of course, that during the operation of the alternator 10 the contacts 55 and 56 are closed during a portion of the time to short circuit the resistor 58 out of the field circuit but at other times, such as when the speed of the alternator increases or the external load is suddenly decreased, the magnet coil 54 will cause opening of the contacts 55 and 56 to temporarily insert the resistor 58 in the field circuit. It will also be understood that this functioning of the regulator takes place with a substantially continuous rapid vibratory movement of the armature 53 to intermittently insert the resistor 58 into, and short-circuit the same out of the field circuit, and that the net result is that the terminal voltage of the alternator 10 will be maintained substantially constant.

Figure 2:
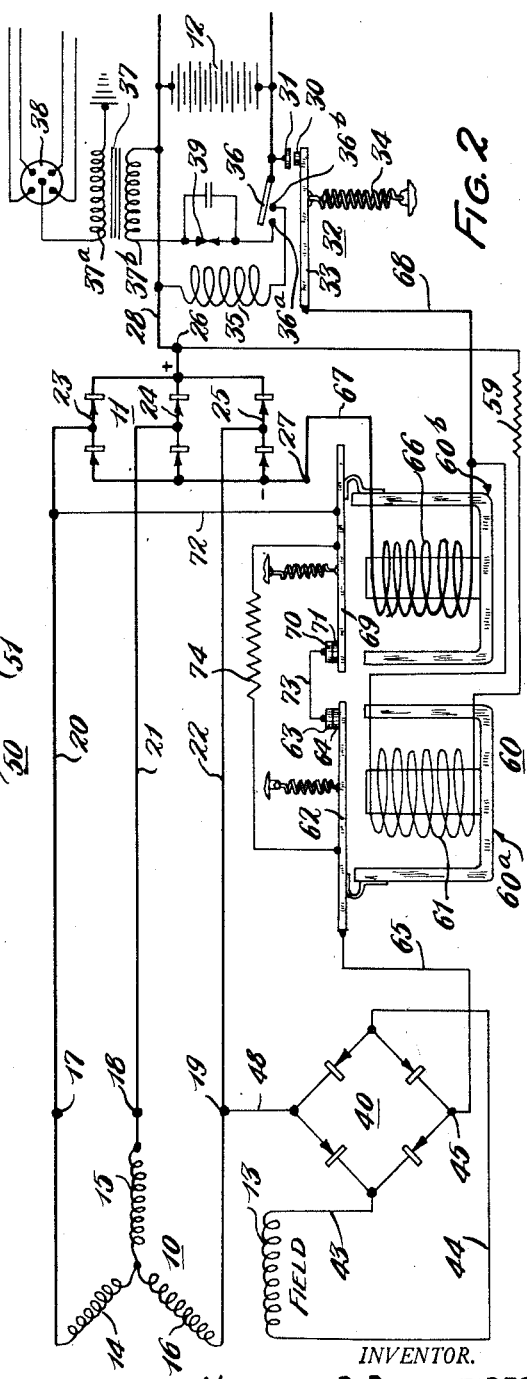
Fig. 2 is a wiring diagram showing another such alternator-rectifier system in which the regulating means includes both voltage and current regulator units.

Fig. 2 of the drawing shows an alternator-rectifier system which is similar to that shown in Fig. 1 and described above and in which the same corresponding parts have been designated by the same reference characters. In the modified system of Fig. 2, however, a regulating means 60 is employed which is somewhat different and which comprises a voltage regulator 60a and a current regulator 60b. The voltage regulator 60a is of a construction similar to the voltage regulator 50 and comprises a voltage coil 61 which is connected across the direct current load terminals 26 and 27 of the main rectifier 11. This voltage regulator also includes an armature 62 and a pair of cooperating stationary and movable vibratory switch contacts 63 and 64 corresponding with the contacts 55 and 56 of the regulator 50. The armature 62 is connected with the terminal 45 of the auxiliary rectifier 40 by the conductor 65.

The current regulator 60b is also of a construction similar to the above described regulator 50 but is provided with a current magnet coil 66 which is connected in series relation with the direct current load terminal 27 of the rectifier 11 and the load relay 32 by the conductors 67 and 68. The current regulator 60b also includes an armature 69 and a pair of cooperating vibratory stationary and movable switch contacts 70 and 71, of which the movable contact 71 is carried by this armature. Although the voltage regulator 60a and the current regulator 60b are here shown as separate devices, they can, of course, constitute portions of a single regulating unit.

As represented by the circuit arrangements shown in Fig. 2, the armature 69 of the current regulator 60b and the movable contact 71 carried by this armature are connected with one of the alternating current terminals of the alternator 10, in this instance the terminal 17, by the conductor 72. The stationary contacts 63 and 70 of the voltage regulator 60a and the current regulator 60b are connected in series relation by a conductor 73 and, from the circuit arrangement thus far described, it will be seen that the two pairs of vibratory contacts of the regulating means 60 will be connected in series relation in the alternating current portion of the excitation circuit for the field winding 13. The significance of this arrangement is that these pairs of regulator contacts will be traversed by alternating current and the above explained advantages will be realized therefrom.

The regulating means 60 includes a resistor 74 which corresponds with the resistor 58 of Fig. 1, but the resistor 74 is connected in the field circuit in shunt relation to both pairs of vibratory contacts 70, 71 and 63, 64 by having its ends connected to the two armatures 62 and 69. With the circuit arrangement just described for Fig. 2, it will be seen that the regulating means 60 will respond to both voltage and current changes in the operating conditions of the alternator 10 and upon the opening of either pair of vibratory contacts, the resistor 74 will be inserted into the field circuit.

Fig. 3 of the drawings shows an alternator-rectifier system which is generally similar to the systems shown in Figs. 1 and 2, and already described above, in that it comprises the alternator 10, the main rectifier 11 and the load relay 32, and which devices are connected in the same general arrangement by the alternating current load conductors 20, 21 and 22 and the direct current load conductors 28 and 29. The system illustrated in Fig. 3 also includes a regulator unit 75 which comprises a voltage regulator 75a of the relay type and a current regulator 75b also of the relay type. The voltage regulator 75a differs from the voltage regulator 60a, described above, in that the regulator 75a includes a secondary magnet coil 76 in addition to a voltage magnet coil 77. The secondary coil 76 has one end thereof connected with the direct current terminal 41 of the field rectifier 40 through a conductor 78 and a ballast resistance 79. The other end of this secondary coil is connected with the direct current load terminal 42 of the field rectifier 40 through the conductor 80 and a portion of the conductor 44.

In other respects the regulator unit 75 is identical with the above described regulator unit 60, that is to say the voltage regulator 75a includes a vibratory armature 62 and a pair of cooperating stationary and movable switch contacts 63 and 64. Similarly, the current regulator 75b includes a vibratory armature 69 and a pair of cooperating stationary and movable switch contacts 70 and 71, and also includes a magnet coil. The regulator unit 75 also includes circuit connections 72, 73 and 65 and a point resistance 74 similar to the corresponding circuit connections and point resistance in the regulator unit 60 of Fig. 2.

When the voltage regulator 75a includes the secondary magnet winding 76, as shown in Fig. 3 and explained above, the voltage regulator magnet will be energized from the field rectifier 40, as well as from the direct current load circuit conductors 28 and 29, and the voltage regulator armature 62 will have a vibratory action which is more satisfactory and more directly responsive to the varying conditions of operation of the alternator 10.

Fig. 4 of the drawings shows an alternator-rectifier system which is similar to the systems shown in Figs. 1 to 3 inclusive and already described above, in that it includes the alternator 10, the main rectifier 11, the load relay 32 and the field rectifier 40. The system of Fig. 4 also includes a regulator unit 82 which comprises a voltage regulator 82a of the relay type and a current regulator 82b, also of the relay type. The voltage regulator 82a is similar to the voltage regulator 75a in that it includes a voltage magnet coil 77 and a secondary magnet coil 76, of which the latter is connected with the direct current terminals 41 and 42 of the field rectifier 40. The current regulator 82b is similar to the current regulator 75b in that it includes a series magnet coil 66 which is located in the external direct current load circuit.

The regulator unit 82 of Fig. 4 differs from the regulator unit 75 of Fig. 3 in that the vibratory armature 83 of the voltage regulator 82a carries two movable upper and lower switch contacts 84 and 85 which cooperate, respectively, with upper and lower stationary switch contacts 86 and 87. Similarly, the vibratory armature 88 of the current regulator 82b carries two movable upper and lower switch contacts 89 and 90 which cooperate, respectively, with a pair of upper and lower stationary switch contacts 91 and 92.

The circuit connections for the regulator unit 82 differ from the circuit connections for the regulator unit 75 in that the regulator unit 82 includes a point resistance 93 which has one end thereof connected with the armature 88 and its other end connected with a conductor 94 which extends from the load conductor 20 to the stationary switch contact 86. These circuit connections also include a conductor 95 having one end thereof connected with the armature 83 and its other end connected with the upper stationary switch contact 91 of the current regulator 82b. The lower stationary contacts 87 and 92 of the voltage and current regulators 82a and 82b are connected with each other by a conductor 95 and are also connected with the load conductor 22 by a conductor 96. The armature 88 of the current regulator 82b is connected with the alternating current terminal 45 of the field rectifier 40 by the conductor 65.

When a regulator unit is embodied in the alternator-rectifier system and comprises the double contact voltage regulator 82a and the double contact current regulator 82b, as just described above, the regulator unit will provide a more effective and wider range of regulating action on the alternator. During certain conditions of operation of the alternator 10, these regulators will function with the upper movable contacts 84 and 89 in vibratory cooperation with the upper stationary contacts 86 and 91. During this functioning, the point resistance 93 will be intermittently short-circuited out of the field energizing circuit whenever both pairs of upper contacts 84, 86 and 89, 91 are closed and will be reinserted in the field energizing circuit whenever one or the other of these two upper pairs of switch contacts is opened.

During other conditions of operation of the alternator 10, the voltage and current regulators 82a and 82b will function with the lower movable contacts 85 and 90 in vibratory cooperation with the lower stationary contacts 87 and 92. The provision of these pairs of cooperating lower contacts in the regulator unit 82 produces a very effective control function because the closing of either pair of these lower contacts causes the alternating current terminal 45 of the field rectifier 40 to be connected directly with the load conductor 22 and, whenever this occurs, the alternating current portion of the field energizing circuit will be substantially deenergized because the terminals 45 and 46 of the field rectifier 40 will then both be connected with the same load conductor 22. When this condition occurs, a sudden collapse of the field flux being produced by the field winding 13 takes place and, hence, these pairs of lower contacts produce a strong and effective regulating action on the alternator 10.

From the foregoing description and the accompanying drawing it will now be readily understood that this invention provides an improved form of alternator-rectifier electrical system in which novel regulating means is employed and produces a very efficient and wide-range automatic control for the field excitation of the alternator. It will also be understood that since the switch contacts of the regulator means are traversed only by the alternating current portion of the field excitation current, the transfer of metal from one contact to the other will be minimized, as well as the pitting and burning which has heretofore occurred at this point, and the contacts will remain in good condition for a long and efficient period of service. It will also be seen that since the magnet coil or coils of the regulator means are energized by rectified current supplied either from the direct current load terminals of the main rectifier, or from the main rectifier and the field rectifier jointly, the core of the regulator means will be strongly and effectively magnetized so as to produce a desired rapid rate of vibratory movement for the armature.

Although the improved electrical system of this invention has been illustrated and described herein to a detailed extent and by way of example has been referred to as a vehicle electrical system, it should be understood that the invention is not to be regarded as being limited correspondingly in scope, but includes all changes and modifications coming within the terms of the claims hereof.

Having thus described my invention, I claim:

1. In an electrical system, an alternator having a field winding, a full-wave bridge type rectifier, a direct current external load circuit connected with said alternator through said rectifier, a regulator of the relay type comprising magnet coil means and vibratory contact means adapted to be actuated by said magnet coil means, circuit means for energization of said magnet coil means by rectifier current, and means for energizing said field winding including alternating current circuit means connected with said alternator and controlled by the vibratory contact means of said regulator.

2. In an electrical system, an alternator having a field winding, a full-wave bridge type rectifier, a direct current external load circuit connected with said alternator through said rectifier, regulator means of the relay type comprising voltage and current magnet coil means and vibratory contact means adapted to be actuated by said magnet coil means, circuit means for energization of said magnet coil means by rectified current with said voltage coil means connected across said load circuit and said current coil means located in series connected relation with said load circuit, and means for energizing said field winding including alternating current circuit means connected with said alternator and controlled by the vibratory contact means of said regulator means.

3. In an electrical system, an alternator having a field winding, a main full-wave bridge type rectifier, a direct current external load circuit connected with said alternator through said main rectifier, a regulator of the relay type comprising magnet coil means and an armature adapted to be vibrated by said magnet coil means, field circuit means for energization of said field winding from said alternator and including a direct current circuit portion and an alternating current circuit portion, a second full-wave bridge type rectifier in said field circuit means and connecting said direct current circuit portion with said alternating current circuit portion, circuit means for energization of said magnet coil means by rectified current, and switch contact means actuated by said armature and located in said alternating current circuit portion.

4. In an electrical system, an alternator having a field winding, a main full-wave bridge type rectifier, a direct current load circuit connected with said alternator through said main rectifier, a regulator of the relay type comprising a magnet coil connected with said load circuit on the direct current side of said main rectifier to be variably energized by rectified current in accordance with the operating condition of said alternator and an armature adapted to be vibrated in response to variations in the energization of said magnet coil, a field circuit for energization of said field winding from said alternator and including a direct current portion and an alternating current portion, a second full-wave bridge type rectifier in said field circuit connecting said direct current portion with said alternating current portion, and switch contact means actuated by said armature and located in said alternating current portion for controlling the energization of said field winding.

5. In an electrical system, an alternator having a field winding, a main full-wave bridge type rectifier, a direct current load circuit connected with said alternator through said main rectifier, regulator means of the relay type having voltage and current magnet coils connected with said load circuit means on the direct current side of said main rectifier to be variably energized by rectified current in accordance with the operating condition of said alternator and an armature adapted to be vibrated in response to variations in the energization of said magnet coils, the voltage coil means of said regulator being connected across said load circuit and said current coil means being in series with said load circuit, a field circuit for energization of said field winding from said alternator and including a direct current portion and an alternating current portion, a second full-wave bridge type rectifier in said field circuit connecting said direct current portion with said alternating current portion, and switch contact means actuated by said armature and located in said alternating current portion for controlling the excitation of said field winding.

6. In an electrical system, an alternator having alternating current terminals and a field winding, a main full-wave bridge type rectifier connected with said alternator and having direct current load terminals, a second full-wave bridge type rectifier, field circuit means connected with said alternating current terminals and adapted to supply energizing current to said field winding through said second rectifier, regulator means of the relay type comprising magnet coil means and an armature adapted to be vibrated by said magnet coil means, circuit means for energization of said magnet coil means by rectified current, and switch contact means controlling the field winding excitation and located in the alternating current portion of said field circuit means so as to be traversed by alternating current for increased contact life.

7. In an electrical system, an alternator having alternating current terminals and a field winding, a main full-wave bridge type rectifier connected with said alternator and having direct current load terminals, a second full-wave bridge type rectifier, field circuit means connected with said alternating current terminals and adapted to supply energizing current to said field winding through said second rectifier, and regulator means of the relay type having magnet coil means connected with the direct current load terminals of said main rectifier and a pair of vibratory switch contacts controlling the field winding excitation and located in said field circuit means at a point between said second rectifier and said alternating current terminals so as to be traversed by alternating current for increased contact life, said regulator means also comprising a magnet frame having said magnet coil means thereon and an armature hinged to said magnet frame for swinging movement in response to changes in the energization of said magnet coil means and having one of said switch contacts mounted thereon, said regulator additionally comprising a spring acting on said armature and urging the same toward a position of closed engagement of said one contact with the other contact of said pair and a resistor located in said field circuit means at a point to be intermittently short-circuited by the closing of said contacts.

8. In a vehicle electrical system, an alternator adapted to be driven at variable speeds and having alternating current terminals and a field winding, a main full-wave bridge type rectifier connected with said alternator and having direct current load terminals, a second full-wave bridge type rectifier, field circuit means connected with said alternating current terminals and adapted to supply energizing current to said field winding through said second rectifier, and regulator means of the relay type having voltage and current magnet coils respectively connected across and in series relation to the direct current load terminals of said main rectifier and vibratory switch contacts controlling the field winding excitation and located in said field circuit means at a point between said second rectifier and said alternating current terminals so as to be traversed by alternating current for increased contact life.

9. In an electrical system, an alternator having alternating current terminals and a field winding, a main full-wave bridge type rectifier connected with said alternator and having direct current load terminals, a second full-wave bridge type rectifier having direct current terminals with which said field winding is connected, alternating current circuit means connecting said second rectifier with said alternating current terminals, and a voltage regulator of the relay type comprising a voltage magnet coil connected across said direct current load terminals and a secondary coil connected with the direct current terminals of said second rectifier and vibratory switch contact means comprising a pair of contacts responsive to said magnet coils and located in said alternating current circuit means, said regulator also comprising a magnet frame having said voltage coil and said secondary coil thereon and an armature hinged to said magnet frame for swinging movement in response to changes in the energization of said voltage coil and having one contact of said pair mounted thereon, said regulator additionally comprising a spring acting on said armature and urging the same toward a position of closed engagement of said one contact with the other contact of said pair and a resistor located in said alternating current circuit means at a point to be intermittently short-circuited by the closing of said contacts.

10. In an electrical system, an alternator having alternating current terminals and a field winding, a main rectifier connected with said alternator and having direct current load terminals, an external load circuit connected with said direct current load terminals, a second rectifier having direct current terminals, means connecting said field winding with the direct current terminals of said second rectifier, alternating current circuit means connecting said second rectifier with said alternating current terminals, a current regulator of the relay type comprising a series magnet coil in said load circuit and vibratory switch contact means responsive to said series magnet coil and located in said alternating current circuit means, and a voltage regulator of the relay type comprising a voltage magnet coil connected across said direct current load terminals and a secondary coil connected with the direct current terminals of said second rectifier and vibratory switch contact means responsive to said voltage regulator magnet coils and also located in said alternating current circuit means.

11. In an electrical system, an alternator having a field winding and polyphase alternating current terminals, a polyphase full-wave bridge type main rectifier connected with said alternator and having direct current load terminals, a second rectifier having direct current terminals with which said field winding is connected, alternating current circuit means connecting said second rectifier with said alternating current terminals, an electromagnetic voltage regulator having a voltage magnet coil connected across said direct current load terminals and vibratory switch contacts located in said alternating current circuit means, and a second electromagnetic regulator having a current magnet coil connected in series relation to said direct current load terminals and vibratory switch contacts also located in said alternating current circuit means.

12. In an electrical system, an alternator having a field winding and polyphase alternating current terminals, a polyphase full-wave bridge type main rectifier connected with said alternator and having direct current load terminals, a second rectifier having direct current terminals with which said field winding is connected, alternating current circuit means connecting said second rectifier with said alternating current terminals, an electromagnetic voltage regulator having a voltage magnet coil connected across said direct current load terminals and a pair of vibratory switch contacts located in said alternating current circuit means, a second electromagnetic regulator having a current magnet coil connected in series relation to said direct current load terminals and a pair of vibratory switch contacts also located in said alternating current circuit means, and resistor means connected in said alternating current circuit means in shunt relation to the pairs of switch contacts of both of said regulators.

13. In an electrical system, an alternator having alternating current terminals and a field winding, a main rectifier connected with said alternator and having direct current load terminals, an external load circuit connected with said direct current load terminals, a second rectifier having direct current terminals, means connecting said field winding with the direct current terminals of said second rectifier, alternating current circuit means connecting said second rectifier with said alternating current terminals, a current regulator of the relay type comprising a series magnet coil in said load circuit and vibratory switch contact means responsive to said series magnet coil and located in said alternating current circuit means, a voltage regulator of the relay type comprising a voltage magnet coil connected across said direct current load terminals and a secondary coil connected with the direct current terminals of said second rectifier and vibratory switch contact means responsive to said voltage regulator magnet coils and also located in said alternating current circuit means, and a field regulating resistance in said alternating current circuit means, the contact means of one of said regulators comprising two pairs of cooperating switch contacts of which one pair is effective when closed to short-circuit said field regulating resistance out of said alternating current circuit means and the other pair is effective when closed to substantially completely deenergize said alternating current circuit means.

14. In an electrical system, an alternator having alternating current terminals and a field winding, a main rectifier connected with said alternator and having direct current load terminals, an external load circuit connected with said direct current load terminals, a second rectifier having direct current terminals, means connecting said field winding with the direct current terminals of said second rectifier, alternating current circuit means connecting said second rectifier with said alternating current terminals, a current regulator of the relay type comprising a series magnet coil in said load circuit and vibratory switch contact means responsive to said series magnet coil and located in said alternating current circuit means, a voltage regulator of the relay type comprising a voltage magnet coil connected across said direct current load terminals and a secondary coil connected with the direct current terminals of said second rectifier and vibratory switch contact means responsive to said voltage regulator magnet coils and also located in said alternating current circuit means, and a field regulating resistance in said alternating current circuit means, the contact means of both of said regulators comprising two pairs of cooperating switch contacts of which one pair is effective when closed while the corresponding pair of contacts of the other regulator are closed to short-circuit said field regulating resistance out of said alternating current circuit means and the other pair is effective when closed to substantially completely deenergize said alternating current circuit means.

NICHOLAS D. DIAMANTIDES.

REFERENCES CITED

The following references are of record in the file of this patent:

UNITED STATES PATENTS

| Number | Name | Date |
|---|---|---|
| 877,258 | Thomas | Jan. 21, 1908 |
| 2,018,348 | Dijksterhuis | Oct. 22, 1935 |
| 2,093,197 | Kern | Sept. 14, 1937 |
| 2,386,040 | Edwards | Oct. 2, 1945 |